UNITED STATES PATENT OFFICE.

JULIUS GEBHARD, OF NEW YORK, N. Y., ASSIGNOR, BY DIRECT AND MESNE ASSIGNMENTS, OF FIVE-EIGHTHS TO SOL HEILPERN AND JOHN S. LOCKWOOD, BOTH OF SAME PLACE.

PROCESS OF UTILIZING SPENT HOPS IN THE MANUFACTURE OF MALT LIQUORS.

SPECIFICATION forming part of Letters Patent No. 257,935, dated May 16, 1882.

Application filed February 18, 1882. (No specimens.)

*To all whom it may concern:*

Be it known that I, JULIUS GEBHARD, of the city, county, and State of New York, have invented a new, improved, and economical Process of Utilizing Spent Hops in the Manufacture of Malt Liquors, of which the following is a description.

By my invention an increase of the useful, desirable, and necessary ingredients of the hops to an extent of about forty per centum over and above the yield which is obtained from hops by the process now generally in use is realized.

It is a well-known fact that by the present mode of only boiling the hops with the wort in the kettle their useful, desirable, and necessary ingredients are by no means entirely exhausted. I propose to take the hops so boiled and unexhausted and treat them so as to extract, approximately at least, the useful and necessary ingredients still remaining unexhausted. This may be done in a measure by placing the hops from a first brewing in the mash-tub with the mash in a subsequent brewing; but the treatment hereinafter described greatly enhances the results obtained. For that purpose, and for the further purpose of preserving and preparing them after the usual treatment in one brewing for a subsequent extraction, I steep them, as soon as the wort is drained off, in a solution of sulphite of soda in water. The hops in such solution I put in the mash-tub in a subsequent brewing, while the process of mashing is going on, and sufficiently early to thoroughly mix the hops with the mash, and then I proceed with the operation of mashing and drawing off the wort in the usual manner. When the hops are so used they are worth in a subsequent brewing, so far as hops are needed, about forty per centum of their original value.

It is desirable and the best results can be obtained if the solution with the hops is made and retained at a temperature over 150° and under boiling-heat or below 40° Fahrenheit. My reason for keeping the solutions at high and low temperature is that both are unfavorable to the formation of lactic acid, (which is well known to be a prejudicial product,) while a temperature between 40° and 150° is favorable to such formation.

In making the solution of sulphite of soda three-quarters of a pound in water, sufficient to cover one hundred pounds of hops, (original dry weight,) is sufficient.

The process might be varied by drawing the wort from the mash and then adding the mixture to the wort, and then again drawing the wort; but the invention consists in so treating the hops after one brewing by the use of such a solution that the hops will be preserved and more thoroughly extracted. Of course fresh hops are used in quantity as desired in excess of the value of the hops treated by my new process. I have experimented with bisulphite of lime with similar results, although not to the same degree, and other sulphites of alkaline substances would have in a degree similar results.

The purpose of the solution is, as stated, the preservation of the hops and the prevention of the formation of deleterious acids, &c., as well as the dissolution of any coating upon the hops which would interfere with a more complete extraction. There is an advantage, too, after the boiling in the first brewing, in introducing the hops into the mash-tub on a subsequent brewing, by which the further extraction is had, at a temperature below the boiling-point of wort, and by which the extraction of the desired ingredients is had without affecting the color or taste of the malt liquor and without extracting such undesirable ingredients as would be dissolved by boiling with the wort.

I am aware that spent hops have been utilized and the processes described in an English patent, No. 543 of 1853, in a patent of the United States to Percy and Wells, No. 46,993, of March 21, 1865, and in Thausing's Malzbereitung und Bierfabrikation, Leipsic, 1877; but these processes are essentially different from the one invented by me, and I claim no feature of them or either of them.

The process of brewing is not changed, except as stated; and

What I claim to be new in my process is—

1. The process of utilizing the spent hops from one brewing, which consists in steeping the same in a solution of sulphite of soda and water and adding the mixture to the mash of a subsequent brewing, substantially as described.

2. The process of utilizing the spent hops in one brewing in a subsequent one, which consists in introducing them into the mash-tub in such subsequent brewing, by which a further extraction is had, at a temperature below the boiling-point of the wort, substantially as described.

JULIUS GEBHARD.

Witnesses:
JAMES DEMAREST,
E. B. BARNUM.